A. M. KARNS.
SPRING BEARING.
APPLICATION FILED DEC. 27, 1910.
1,001,200.
Patented Aug. 22, 1911.
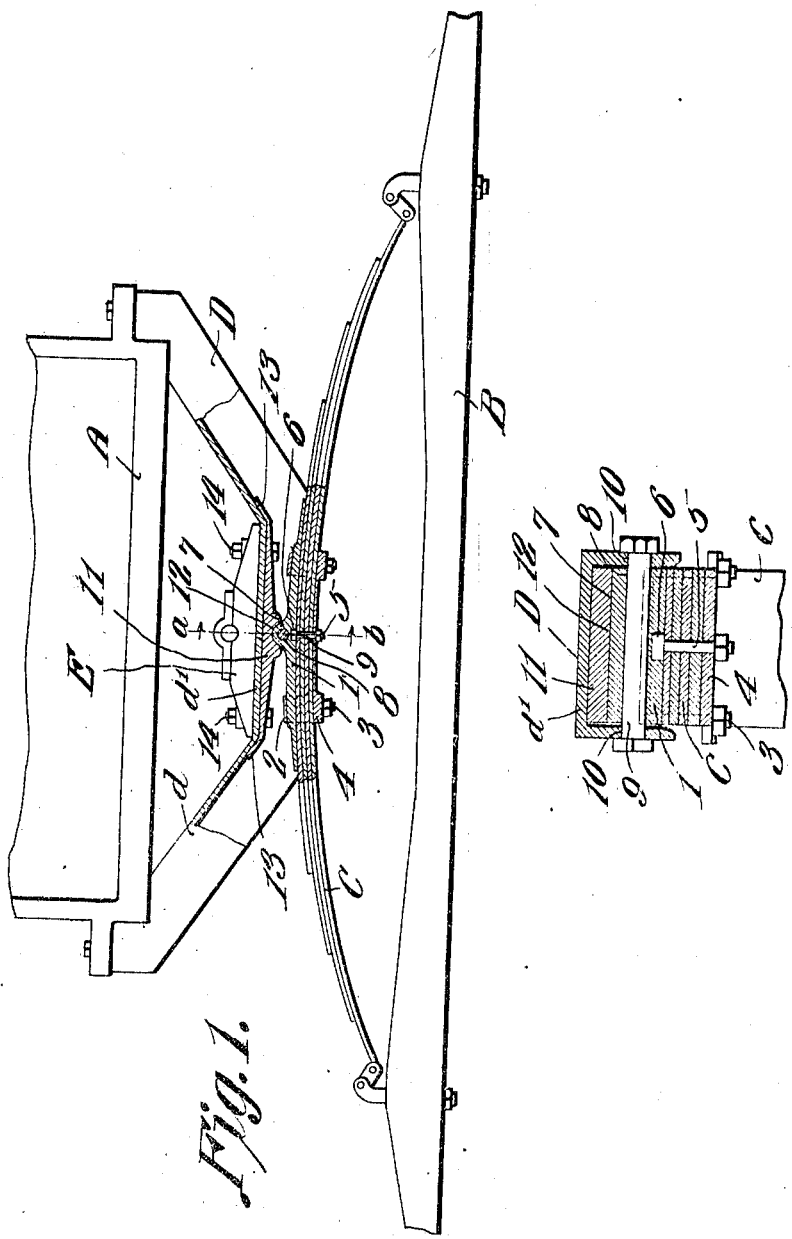

UNITED STATES PATENT OFFICE.

ALEXANDER M. KARNS, OF EVERETT, PENNSYLVANIA.

SPRING-BEARING.

1,001,200.  Specification of Letters Patent.  Patented Aug. 22, 1911.

Application filed December 27, 1910. Serial No. 599,469.

*To all whom it may concern:*

Be it known that I, ALEXANDER M. KARNS, a citizen of the United States, residing at Everett, in the county of Bedford and State of Pennsylvania, have invented a new and useful Spring-Bearing, of which the following is a specification.

This invention relates to vehicles of that type utilizing cross springs between the front axles and the front portions of the bodies, and more particularly to connections between the springs and body, said connections constituting bearings whereby oscillation of the front axle and its spring relative to the body of the vehicle, is permitted.

It has been the practice, heretofore, to provide a rigid connection between the front cross spring of the vehicle and the vehicle body but this form of connection has been found objectionable, because, when the vehicle is passing over an uneven surface or over small obstructions, any oscillation of the axle has resulted in the distortion of the spring and often in the straining or buckling of the vehicle body. Where such an arrangement is used in connection with motor vehicles the transverse twisting strain resulting from the conditions stated has often caused the main frame of the car, and the radiator to become twisted, has broken or otherwise injured the wind shield and has added materially to the wear upon the front tires, due to the fact that the weight is unequally distributed on the front cross spring when the wheels pass over obstructions, etc.

To overcome the objections set forth, a new and novel connection for use between the front spring and body of the vehicle, has been devised and constitutes the subject matter of the present invention.

The invention has for its object the provision of bearing members mounted for relative movement about an axis extending longitudinally of the machine and which constitute the sole connection between the front spring and the frame, this connection thus permitting the front axle and the spring thereon to oscillate and thus insure the equal distribution of weight upon the front spring and wheels and prevent either of the front wheels from raising off of the ground when the other wheel moves over an obstruction.

A further object is to provide a connection of this character which is simple and durable in construction and does not necessitate any change in the construction of the ordinary types of machines or vehicles utilizing cross springs upon the front axles.

A still further object is to provide means whereby the connection is relieved of any thrust which would tend to separate the parts.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings:—Figure 1 is a front elevation of a portion of a vehicle, part of the cross spring and the connection between the spring and the frame of the vehicle being shown in section. Fig. 2 is an enlarged section on the line *a*—*b* Fig. 1.

Referring to the figures by characters of reference A designates the frame of the vehicle, and B designates the front axle, said axle supporting a laminated cross spring C of the usual form and which is connected at its ends to the axle in the usual or any preferred manner. A frame member D extends under and transversely of the frame A and is in the form of an inverted channeled element having inclined end portions *d* and an intermediate portion *d'* parallel with the frame A. All of these parts can be found upon vehicles as now constructed and, in themselves, constitute no part of the present invention.

The improvements to be used in connection with the parts heretofore described include a base plate 1 to be substituted for the top layer of the laminated spring and which is held on the spring by means of clips 2 the threaded terminals 3 of which extend through a plate 4 located under the middle portion of the spring. This plate is also attached to the spring by means of a bolt 5 extending through the center of the spring and having its head seated within a recess 6 in the lower face of the base plate 1.

A substantially semi-cylindrical projection 7 is formed on the middle portion of the plate 1 and extends transversely thereof, this projection having an axial opening 8. A pivot bolt 9 extends through the opening 8 and also through corresponding openings 10 formed within the front and rear portions of the member D at the center thereof. In order that the bolt 9 may be relieved practically of all strain, a bearing member 11 is mounted within the frame member D, this bearing member having a transverse recess 12 in the middle portion of its lower face and which fits snugly upon the projection 7. Said bearing member extends throughout the length of the middle portion $d'$ of member D and has its terminals bent upwardly into the end portions $d$. Bolts 14 or the like may be utilized for fastening the bearing member 11 to the member D and these bolts can also be utilized for securing to the member D a bearing block E on which the cranking shaft is journaled.

It will be apparent that, by providing the connection which has been described, oscillation of the front axle relative to the body of the vehicle is permitted without causing any twisting strain upon the frame of the vehicle or upon any parts carried by the frame. The vehicle will thus travel with greater ease, will have greater tractive powers and will be more lasting than where a rigid connection is provided between the frame and cross spring.

Attention is directed to the fact that the bearing members are housed within the frame member D and are thus protected from water, dirt, etc. Moreover, the member D equally distributes the thrust upon the two members of the bearing, thus eliminating all danger of one member of the bearing being displaced relative to the other member. By extending the head of bolt 5 into recess 6, the plate 1 is prevented from slipping upon the spring C.

What is claimed is:—

1. The combination with a cross spring, of a channeled frame member, a bearing member within the intermediate portion of the frame member, a bearing member secured on the spring and having a rounded projecting portion movably engaged by the first mentioned bearing member, and a pivotal connection extending through said rounded projecting portion and through the frame member for holding said frame member and said projecting portion together, both bearing members being housed within the frame member.

2. The combination with a cross spring, of an inverted channeled frame member having a flat intermediate portion, a bearing member within the intermediate portion of the frame member and having terminals diverging upwardly and engaging corresponding portions of the channeled frame member, a bearing member secured on the spring and having a rounded projecting portion movably engaged by the first mentioned bearing member, and a pivotal connection extending through said rounded projecting portion and through the frame member for holding said frame member and said projecting portion together, both bearing members being housed within the frame member, said frame member constituting means for distributing thrust upon both bearing members.

In testimony that I claim the foregoing as my own, I have hereto affixed my signature in the presence of two witnesses.

ALEXANDER M. KARNS.

Witnesses:
 HERBERT D. LAWSON,
 J. PERCY CAMPBELL.